United States Patent [19]

Myers et al.

[11] Patent Number: 4,539,876
[45] Date of Patent: Sep. 10, 1985

[54] MACHINE TOOL

[75] Inventors: Carl J. Myers, Mentor; Richard O. Ratzel, Westlake, both of Ohio

[73] Assignee: The Warner & Swasey Company, Cleveland, Ohio

[21] Appl. No.: 540,959

[22] Filed: Oct. 11, 1983

[51] Int. Cl.³ ............................................. B23B 17/00
[52] U.S. Cl. ........................................ 82/32; 408/234
[58] Field of Search ................ 82/32, 2 R, 36 A, 1 C; 29/149.5, 460; 156/292, 293, 294; 264/261; 408/234

[56] References Cited

U.S. PATENT DOCUMENTS

| | | | |
|---|---|---|---|
| 1,363,969 | 12/1920 | Groene et al. | 82/32 |
| 1,498,769 | 6/1924 | Wood | 82/32 |
| 1,912,622 | 6/1933 | Cone | 82/32 |
| 1,971,956 | 8/1934 | Hoelscher | 82/32 |
| 2,028,727 | 1/1936 | Perry et al. | 82/32 |
| 2,079,791 | 5/1937 | Cook | 82/1 C |
| 2,337,761 | 12/1943 | Millholland | 82/32 |
| 2,487,289 | 11/1949 | Yeomans et al. | 82/32 |
| 3,837,245 | 9/1974 | Schuler et al. | 82/32 |
| 3,852,979 | 12/1974 | Muhlhausler | 29/460 |

FOREIGN PATENT DOCUMENTS

| | | | |
|---|---|---|---|
| 1125823 | 9/1968 | United Kingdom | 82/32 |
| 560675 | 6/1975 | U.S.S.R. | 29/460 |

OTHER PUBLICATIONS

APC 358562, Published 6/1943, Application of Johannes Wilberz.

Primary Examiner—Leonidas Vlachos
Assistant Examiner—Jerry Kearns
Attorney, Agent, or Firm—Calvin Covell; John R. Benefiel; Raymond J. Eifler

[57] ABSTRACT

An improved machine tool includes a one piece, as cast base having a spindle drive motor mounting section, a wayblock mounting section, a tailstock mounting section and a tank for receiving coolant. The wayblock mounting section includes a basin having a rim and a plurality of upwardly extending projections in a central portion of the basin. Downwardly extending projections on a substantially as cast wayblock extend into the basin. A body of cast in situ material is disposed in the space between as cast surface areas on the upwardly extending base projections and as cast surface areas on the downwardly extending wayblock projections to hold the wayblock against movement relative to the base. A one piece as cast headstock has downwardly extending projections which are received in recesses formed in the wayblock. A second cast in situ body of material is disposed between surfaces on the headstock and the wayblock to hold the headstock against movement relative to the wayblock. An as cast tailstock support bar extends across a portion of the base which forms a coolant tank. Cast in situ bodies of material are formed between projections from the tailstock support bar and side surfaces of recesses in the base to hold the tailstock support bar against movement relative to the base. A chip conveyor assembly extends across the coolant tank to a location adjacent the headstock.

12 Claims, 16 Drawing Figures

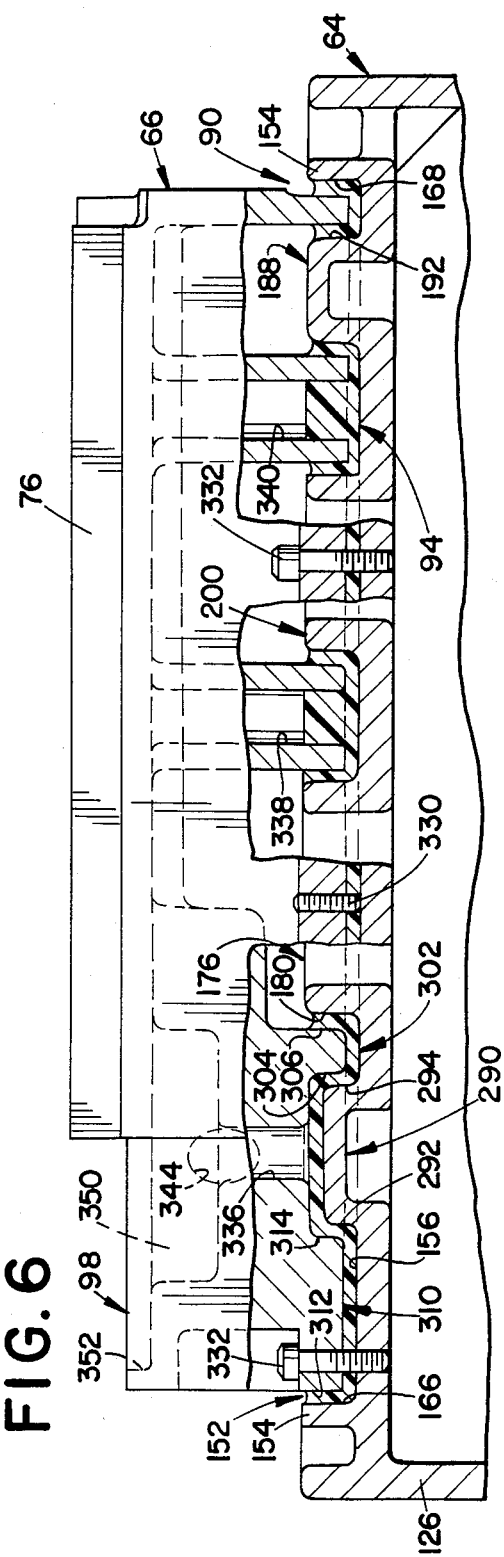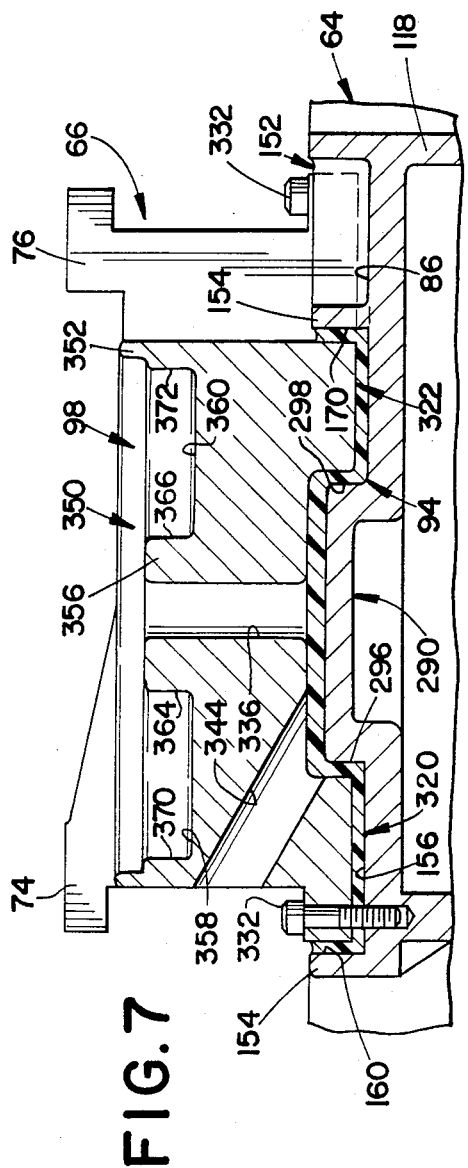

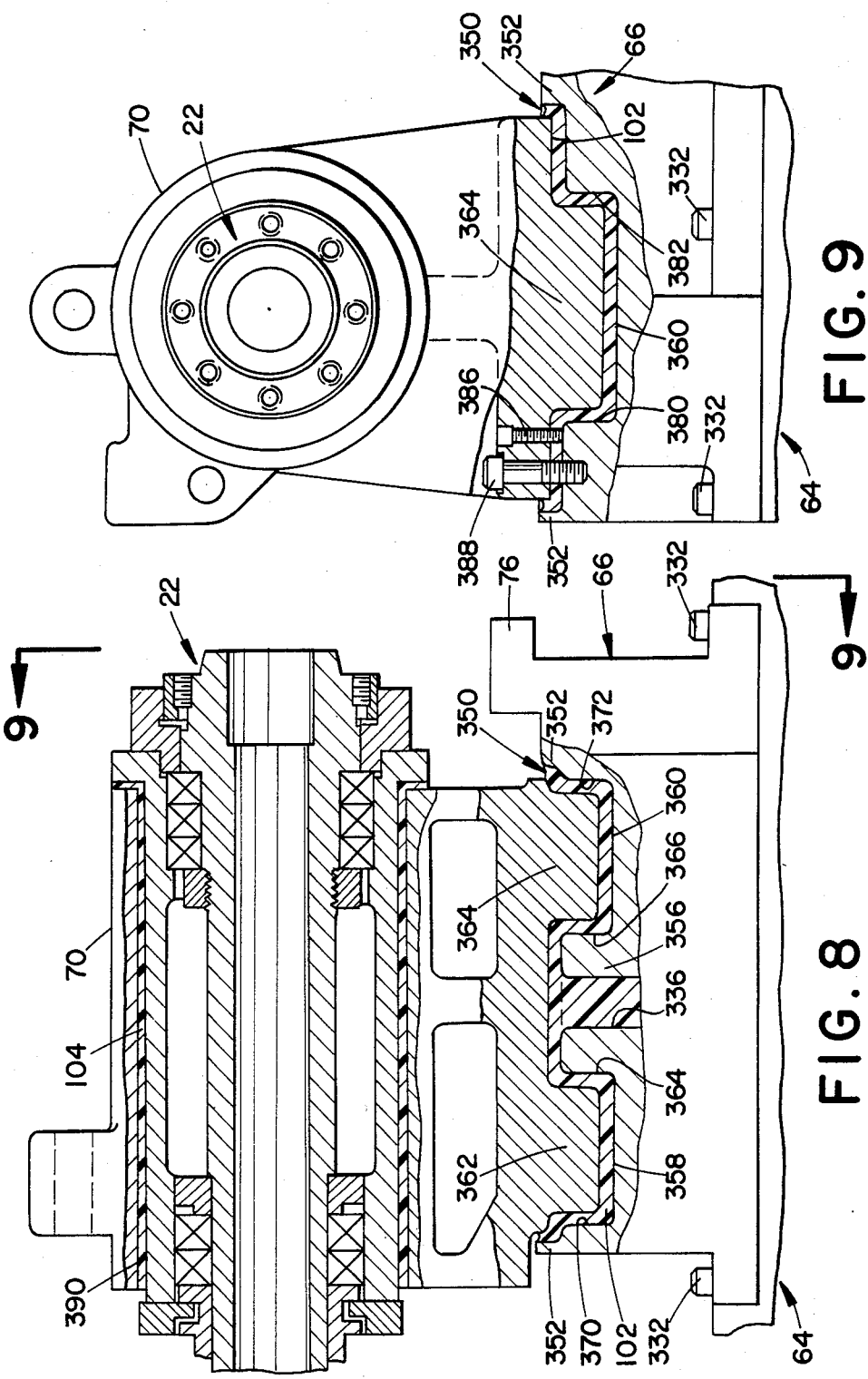

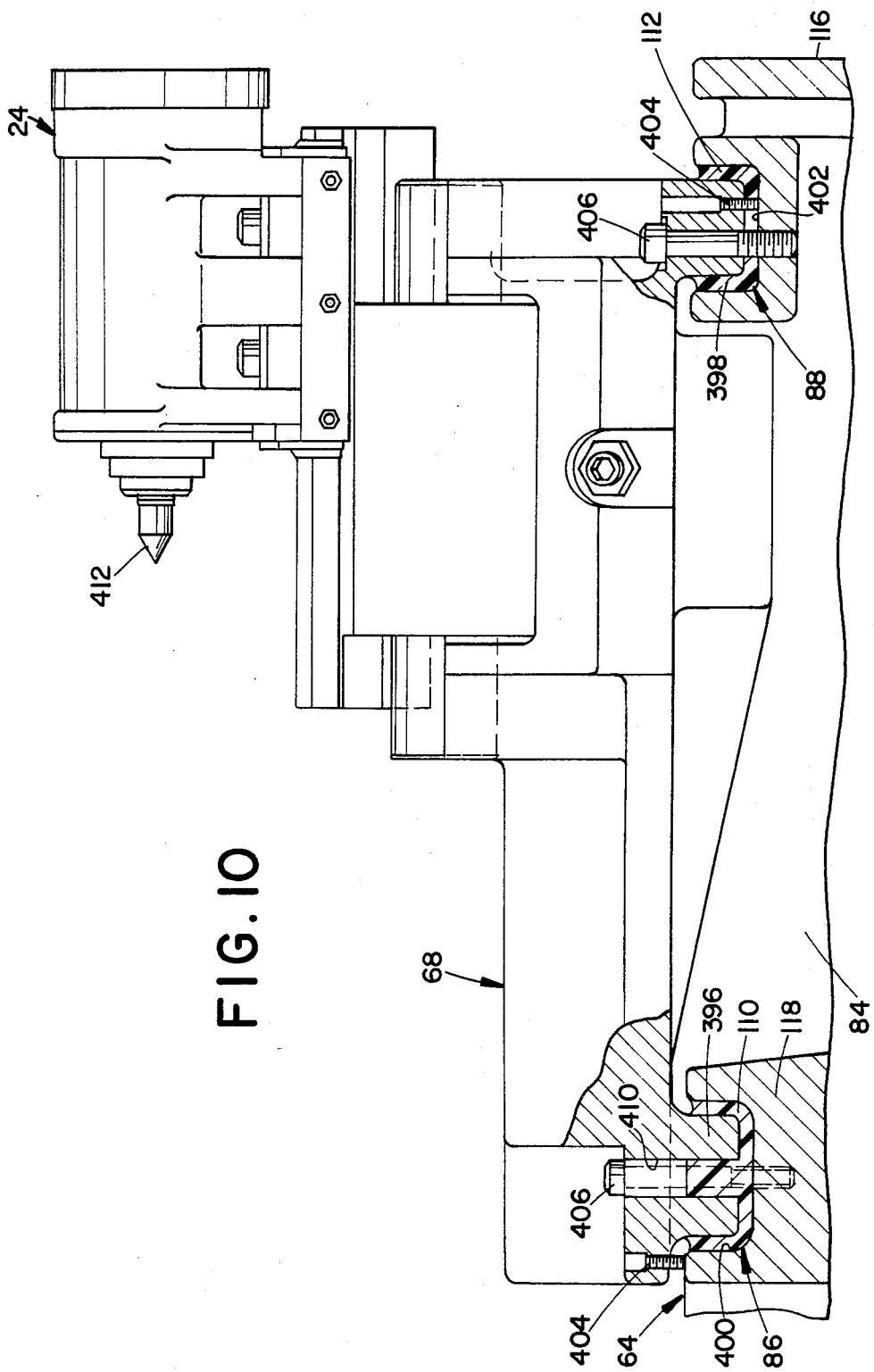

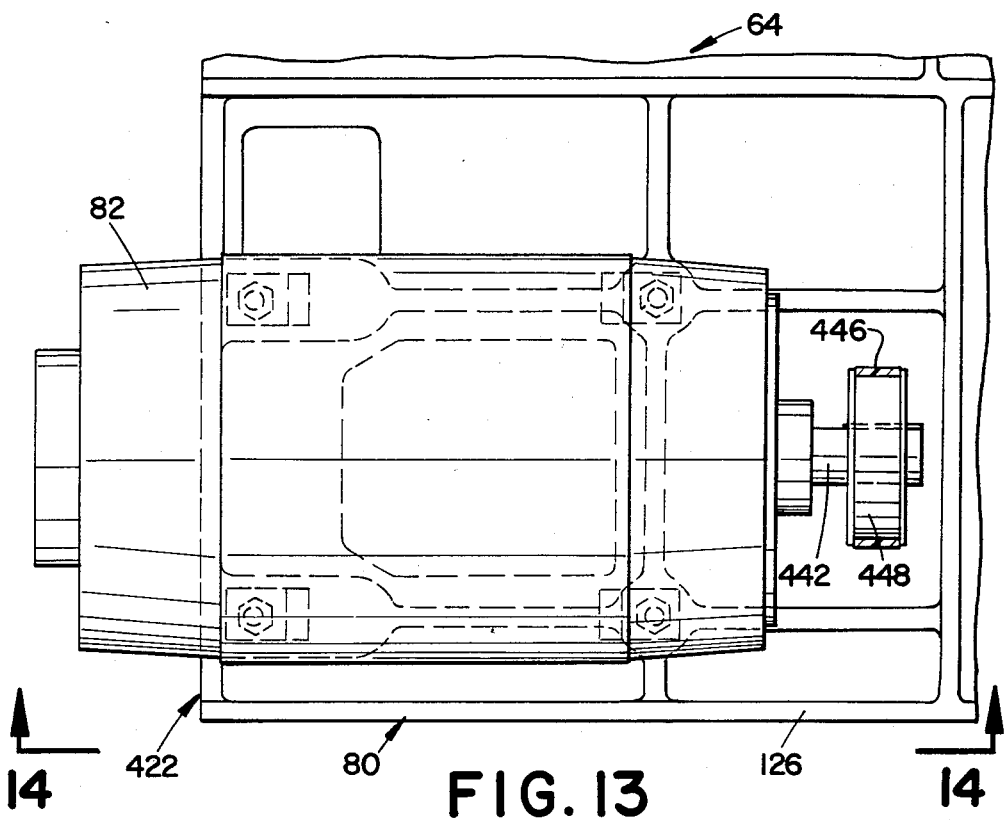
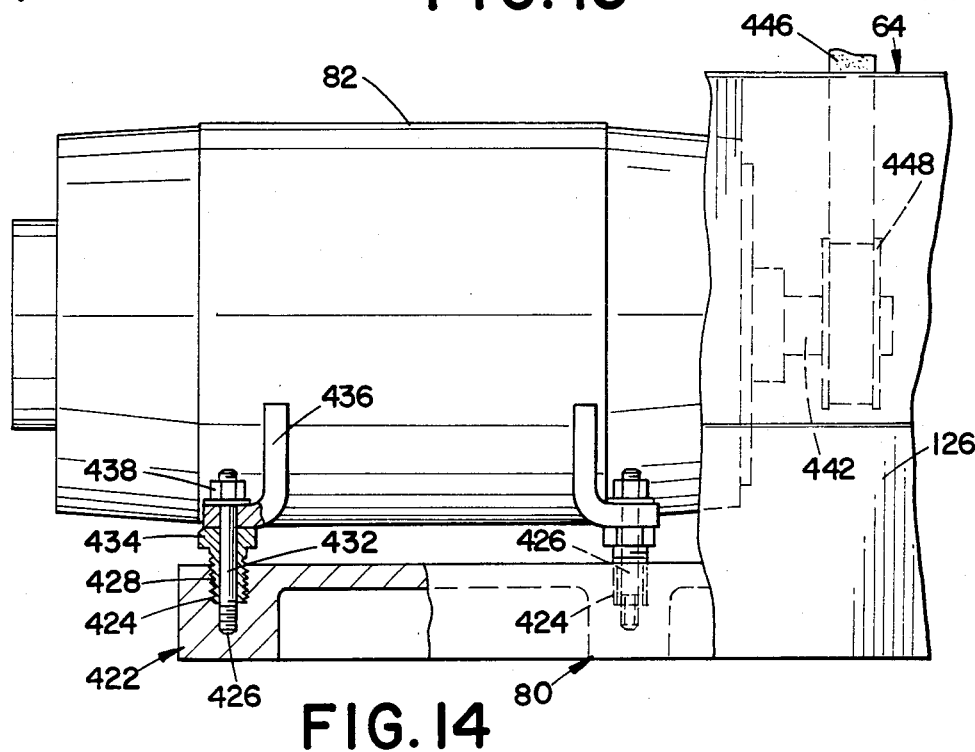

4,539,876

MACHINE TOOL

BACKGROUND OF THE INVENTION

The present invention relates to a new and improved machine tool and more specifically to a machine tool and method of assembling the machine tool so that structural components require a minimum of machining to thereby minimize the cost of the machine tool.

A known machine tool is disclosed in U.S. Pat. No. 3,835,516 to Fullerton. The machine tool disclosed in this patent has achieved a degree of commercial success. However, the machine tool is relatively expensive to manufacture. This is because the machine tool has a relatively large number of components which are accurately formed. Thus, mounting surfaces for the various components of the machine tool of U.S. Pat. No. 3,835,516 must be accurately machined so that a spindle axis is exactly parallel to a turret axis.

The tailstock disclosed in U.S. Pat. No. 3,796,116 is suitable for use with the aforementioned machine tool. However, the components of the tailstock must be accurately machined and rigidly supported on the base of the machine tool. The necessity of accurately machining the mounting surfaces of the tailstock tends to increase the cost of the machine tool.

SUMMARY OF THE PRESENT INVENTION

The present invention provides a new and improved machine tool having structural components which are assembled by a new and improved method with a minimum of machining. Thus, the machine tool has a one piece, as cast base which does not have any or at most a minimum of machined surfaces. Although the base does not have machined surfaces, holes are drilled in the base. At least some of these holes are tapped to received externally threaded fasteners.

A one piece, as cast wayblock is connected with the base. Although the majority of the wayblock is in an as cast condition, tracks for guiding movement of a turret carriage are machined on the wayblock. The machining of these tracks is relatively simple and can be done with straight line machining operations.

The wayblock is held against movement both along and transversely to the tracks by a cast in situ body of material. The cast in situ body of material is received between surfaces formed on upwardly extending projections on the base and surfaces on downwardly extending projections on the wayblock. Some of the surfaces on the wayblock and base projections extend transversely to other surfaces on the projections so that the cast in situ body of material is compressed by machine tool operating forces applied to the wayblock in any direction. Since the cast in situ body of material has a high compression strength, relatively large operating forces can be transmitted from the wayblock to the base.

A headstock and spindle assembly are mounted on one end portion of the wayblock. The headstock is held against movement relative to the wayblock by a body of cast in situ material disposed between downwardly extending surfaces on the headstock and upwardly extending surfaces on the wayblock.

A tailstock assembly is supported on the base by a tailstock support bar. Opposite ends of the tailstock support bar are held against movement relative to the base by cast in situ bodies of material disposed between downwardly extending surfaces on the tailstock support bar and upwardly extending surfaces on the base.

A chip conveyor assembly is advantageously mounted on the base as a unit. Thus, the chip conveyor assembly extends through an as cast hole formed in a sidewall of the base. The chip conveyor assembly is connected with the base by suitable fasteners.

Accordingly, it is an object of this invention to provide a new and improved machine tool which is relatively inexpensive to construct and which has relatively few machined surfaces.

Another object of this invention is to provide a new and improved machine tool which includes an as cast base and a wayblock which is held against movement relative to the base by a body of cast in situ material which is disposed between downwardly extending surfaces on the wayblock and upwardly extending surfaces on the base.

Another object of this invention is to provide a new and improved machine tool as set forth in the next preceding object and wherein a headstock is held against movement relative to the wayblock by a body of cast in situ material which is disposed between downwardly extending surfaces on the headstock and upwardly extending surfaces on the wayblock.

Another object of this invention is to provide a new and improved machine tool wherein a tailstock support bar is held against movement relative to a base by cast in situ bodies of material disposed between downwardly extending surfaces on the tailstock support bar and upwardly extending surfaces on the base.

BRIEF DESCRIPTION OF THE DRAWINGS

The foregoing and other objects and features of the invention will become more apparent upon a consideration of the following description taken in connection with the accompanying drawings wherein:

FIG. 6 is a fragmentary, partially broken away, sectional view, taken generally along the line 6—6 of FIG. 5, illustrating the relationship between the cast in situ body of material and projections on the wayblock and base;

FIG. 7 is a fragmentary sectional view, taken generally along the line 7—7 of FIG. 5, further illustrating the relationship between the cast in situ body of material, the base and the wayblock;

FIG. 8 is a partially broken away fragmentary sectional view illustrating the relationship of a cast in situ body of material to the wayblock and a headstock;

FIG. 9 is a partially broken away fragmentary sectional view, taken generally along the line 9—9 of FIG. 8, further illustrating the relationship between the cast in situ body of material, the wayblock and the headstock;

FIG. 10 is a fragmentary, partially broken away, view illustrating the relationship of a pair of cast in situ bodies of material to recesses in the base and projections formed at opposite ends of a tailstock support bar;

FIG. 13 is a top plan view, taken generally along the line 13—13 of FIG. 2, illustrating the manner in which a spindle drive motor is mounted on the base of the machine tool;

FIG. 14 is a fragmentary and partially broken away side elevational view, taken generally along the line 14—14 of FIG. 13, further illustrating the manner in which the spindle drive motor is mounted on the base of the machine tool;

DESCRIPTION OF ONE SPECIFIC PREFERRED EMBODIMENT OF THE INVENTION

Machine Tool—General

Figure 1:
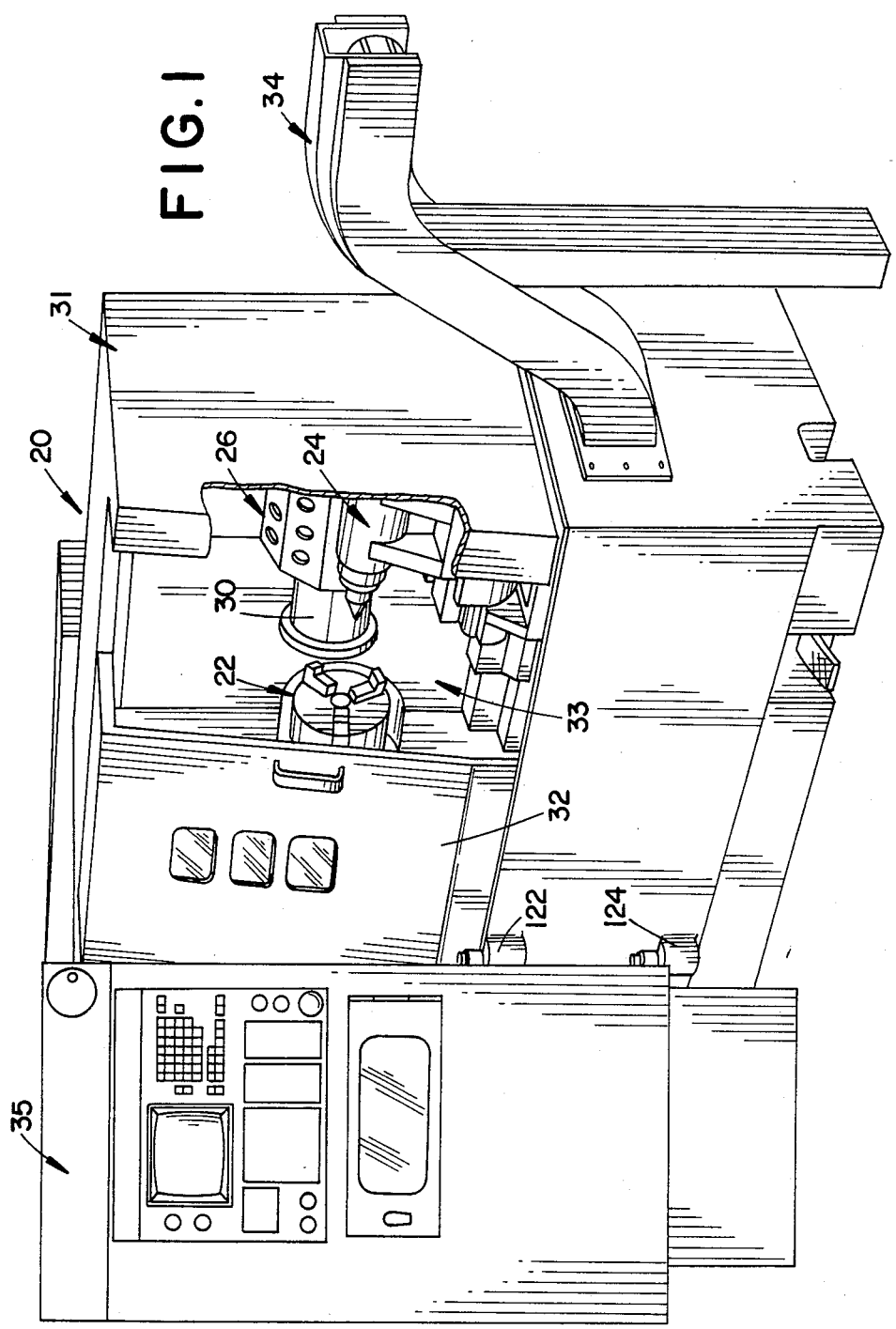
FIG. 1 is a pictorial illustration of machine tool constructed in accordance with the present invention, a portion of a housing being broken away to reveal components of the machine tool.

A machine tool 20 constructed in accordance with the present invention is illustrated in FIG. 1. The machine tool 20 is used to cut material from a workpiece as it is rotated about a horizontal axis by a spindle assembly 22. The free end of the workpiece may be supported by a tailstock assembly 24 while the workpiece is rotated by the spindle assembly 22.

A turret 26 is provided to hold a plurality of tools for cutting material from a workpiece as it is rotated about a horizontal axis by the spindle assembly 22. The turret 26 is mounted on the end of a cylindrical turret bar 30. The turret bar 30 is rotatable about and movable along its central axis which is parallel to the axis of rotation of the spindle assembly 22. In addition, the turret bar 30 is movable toward and away from the spindle assembly 22 along a horizontal path in a direction perpendicular to the axis rotation of the spindle assembly 22.

A housing 31 encloses the spindle assembly 22, tailstock assembly 24 and turret 26. The housing 31 protects an operator during the cutting of material from a workpiece. The housing 31 has a slidable door 32 which is movable rightwardly from the open position shown in FIG. 1 to a closed position blocking access to a work area 33 in which the workpiece is cut to the desired configuration.

By properly moving the turret 26, a workpiece being rotated by the spindle assembly 22 can be cut to a desired configuration in a known manner. A cabinet 35 contains known controls to effect operation of the machine tool 20 to cut the workpiece to the desired configuration. As the workpiece is cut to the desired configuration, a chip conveyor assembly 34 is operated to remove chips or pieces cut from the workpiece.

Figure 2:
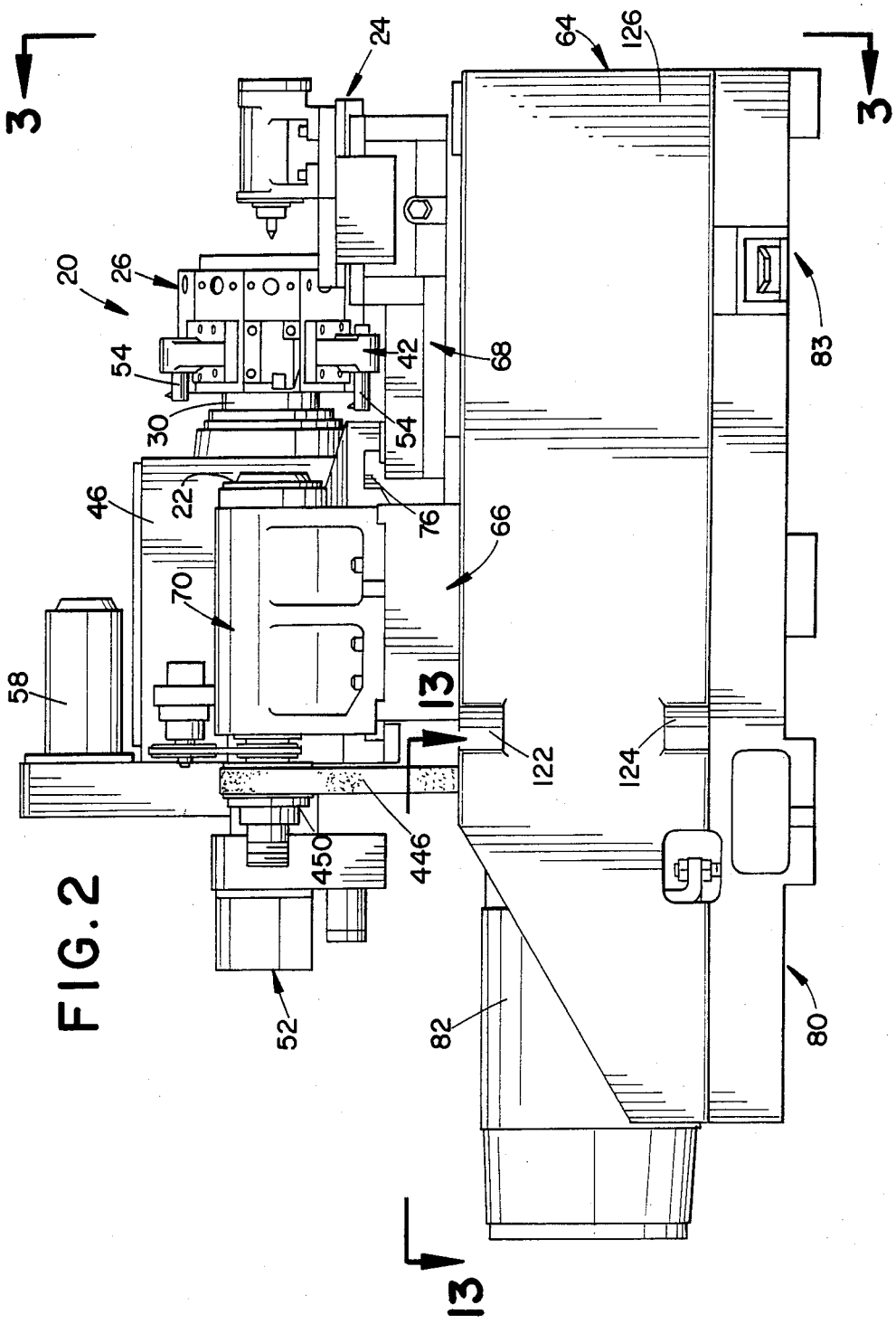
FIG. 2 is a side elevational view of the machine tool of FIG. 1 with the housing and other components removed to illustrate the relationship between a base, wayblock, headstock, and tailstock of the machine tool.
Figure 3:
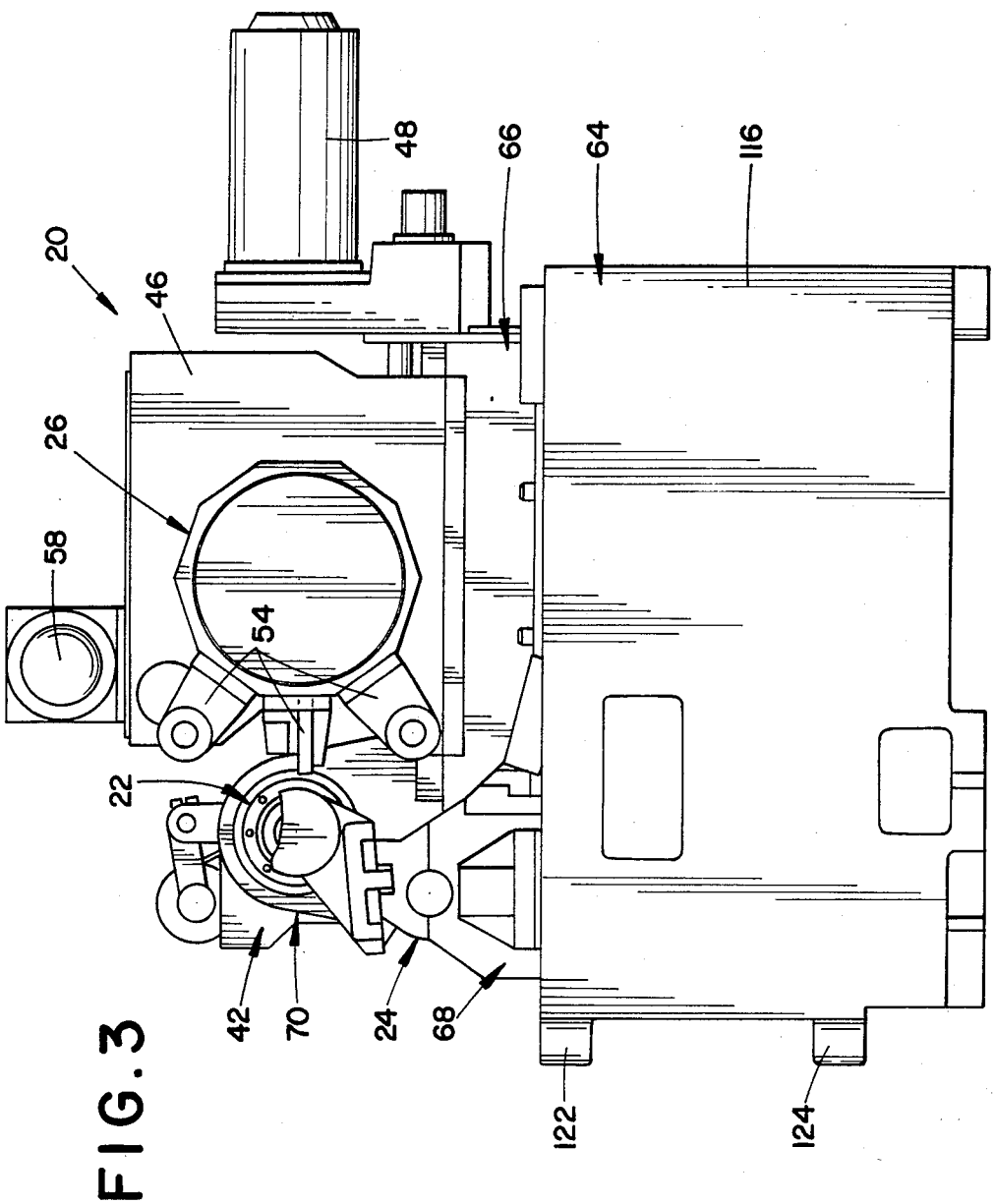
FIG. 3 is an elevational view, taken generally along the line 3—3 of FIG. 2, further illustrating the construction of the machine tool.

During operation of the machine tool 20, a turret bar carriage 46 (see FIGS. 2 and 3) is moved toward and away from the assembly 22 and a workpiece by operation of a cross slide drive assembly 48 (FIG. 3). The cross slide drive assembly 48 includes a motor which is connected with the carriage 46 by a lead screw in a manner similar to that disclosed in U.S. Pat. No. 3,835,516. Operation of the motor in the cross slide drive assembly 48 rotates the lead screw to move the carriage 46 and turret 26 along a path extending perpendicular to the axis of rotation of the spindle assembly.

The turret 26 and support bar 30 (see FIG. 2) are rotatable about their coincident central axes by a turret index drive assembly 52 (FIG. 2). Thus, upon operation of the turret index drive assembly 52, the turret 26 is rotated about its central axis which extends parallel to the axis about which the spindle assembly 22 rotates the workpiece. Upon operation of the cross slide drive assembly 48, the axis of rotation of the turret 26 is moved toward and away from the axis of rotation of the spindle assembly 22 while the axis of rotation of the turret is maintained parallel to the axis of rotation of the spindle assembly.

During removal of material from a workpiece with one of the cutting tools 54 (FIGS. 2 and 3), the turret support bar 30 is movable along its horizontal central axis by a turret feed drive assembly 58. The turret feed drive assembly 58 includes a motor which is connected with the turret in the manner similar to that disclosed in the aforementioned U.S. Pat. No. 3,835,516. Axial movement of the turret support bar 30 moves the turret 26 along a path extending parallel to the axis of rotation of the spindle assembly 22.

To provide for proper operation of the machine tool 20, it is necessary for the central axis of the turret 26 to be precisely parallel to the central axis of the spindle assembly 22. The parallel relationship between the central axes of the turret 26 and spindle assembly 22 must be maintained during sidewise movement of the carriage 46 toward and away from the spindle assembly 22. In addition, the tailstock 24 must support the workpiece for rotation about an axis which is coincident with the central axis of the spindle assembly 22.

In accordance with a feature of the present invention, the machine tool 20 has structural components which are used in a substantially as cast condition. The cast structural components of the machine tool 20 are interconnected by bodies of cast in situ material at joints which are free of machining. The joints between structural components of the machine tool are adjustable during assembly to enable the spindle assembly 22, tailstock assembly 24 and turret 26 to be accurately positioned relative to each other within a very small tolerance range even though the surfaces of the structural components are cast to relatively large tolerances. Using the structural components in an as cast condition tends to minimize the cost of manufacturing the machine tool 20.

Figure 4:
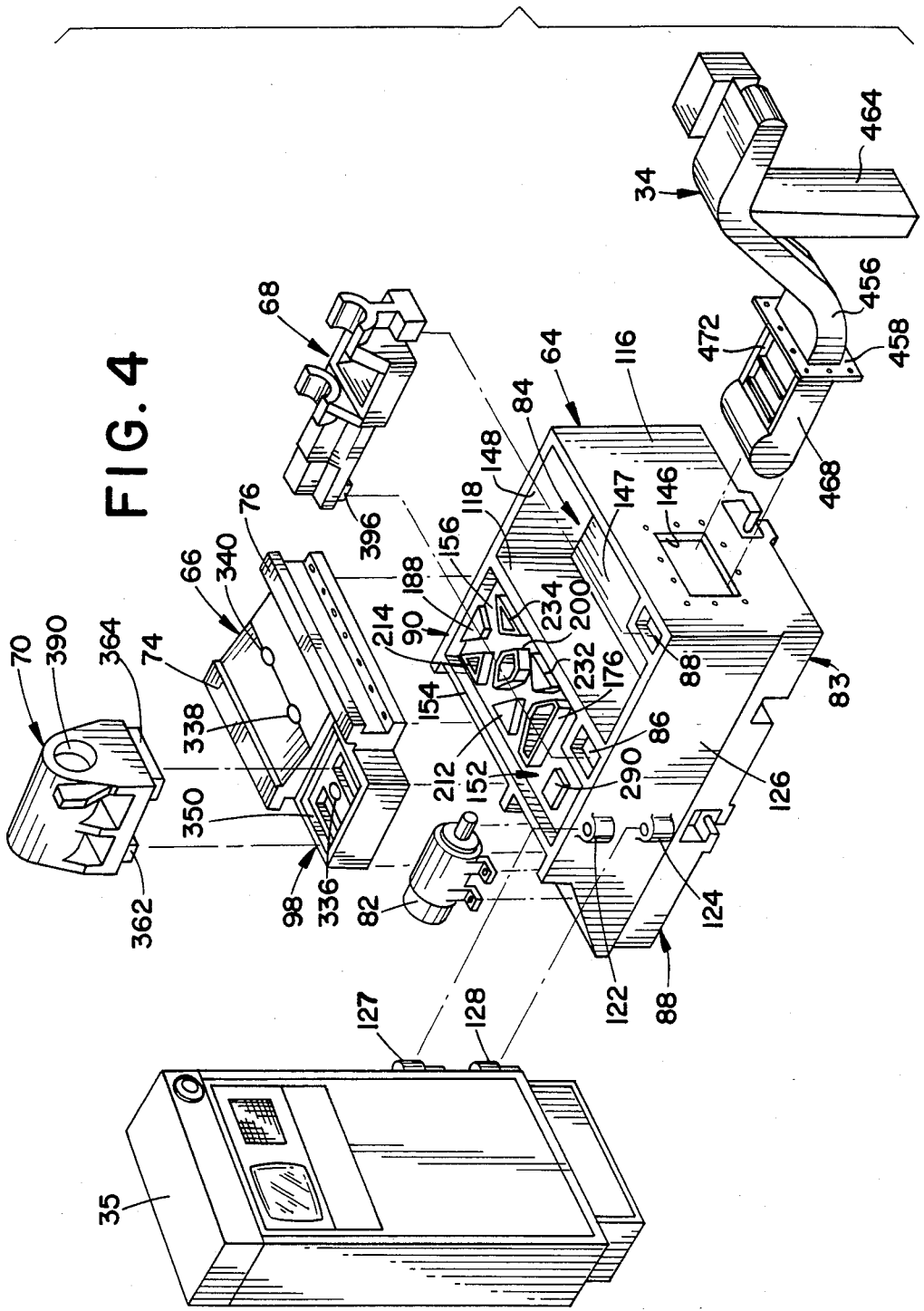
FIG. 4 is an exploded illustration of some of the components of the machine tool of FIGS. 2 and 3, the components being separated to illustrate the construction of the base and its relationship to a wayblock, headstock, tailstock support bar, chip conveyor assembly, spindle drive motor and control cabinet.

The as cast structural components of the machine tool 20 include a generally rectangular base 64 (see FIG. 4). An as cast wayblock 66 and tailstock support bar 68 are mounted directly on the base 64. An as cast headstock 70 is mounted on the wayblock 66. Although the structural components 64–70 are used in a substantially as cast condition, it is contemplated that portions of these components may be machined. For example, parallel carriage guide tracks 74 and 76 are machined on the wayblock 66 to be precisely aligned with each other to guide movement of the turret carriage 46 in a direction perpendicular to the axis of rotation of the spindle assembly 22.

The one piece, cast base 64 includes a spindle drive motor mounting section 80 (see FIGS. 2 and 4) where a motor 82 for driving the spindle assembly 22 is mounted. At the opposite end of the base 64, a tank section 83 forms a rectangular tank 84 for holding coolant. A pair of tailstock mounting sections 86 and 88 (FIG. 4) are provided at opposite sides of the tank 84. In addition, the base is provided with a wayblock mounting section 90 where the wayblock 66 is mounted on the base. With the exception of drilled holes, some of which are tapped, there is no machining on the base 64.

The one piece, cast wayblock 66 is connected with the base 64 at the wayblock mounting section 90 by a body 94 (FIGS. 5, 6 and 7) of cast in situ material. The body 94 of cast in situ material extends across the wayblock mounting section 90 (FIG. 4). Although the wayblock 66 is used in a substantially as cast condition, the horizontal bottom of the wayblock may be machined flat to facilitate machining of the guide tracks 74 and 76. In addition, drilled holes, some of which are tapped, are formed in the wayblock 66.

The wayblock 66 is provided with an as cast headstock mounting section 98 at which the headstock 70 is connected with the wayblock by a second body 102 (FIGS. 8 and 9) of cast in situ material. Although it is preferred to mount the headstock 70 on the wayblock 66 which is mounted on the base 64, the headstock 70 could be mounted directly on the base 64 if desired.

The one piece, cast headstock 70 receives the spindle assembly 22. The spindle assembly 22 is held in place in the headstock 70 by a body 104 (FIG. 8) of cast in situ material in a manner which is the same as that disclosed in U.S. patent application Ser. No. 486,873, filed Apr. 21, 1983, by Richard D. Erickson for "Machine Tool", a continuation of U.S. application Ser. No. 199,019, filed Oct. 20, 1980. By using the cast in situ body of material to connect the headstock 70 with the spindle assembly 22, the position of the spindle assembly relative to the headstock 70 can be adjusted during assembly of the machine tool 20. However, it is contemplated that the spindle assembly 22 could be connected with the headstock 70 in a different manner if desired. For example, the spindle assembly 22 could be connected with the headstock 70 by externally threaded fasteners which extend through openings in the spindle assembly 22 into internally threaded openings in the headstock 70.

The one piece, as cast, tailstock support bar 68 is connected with the base 64 at the mounting sections 86 and 88 (see FIG. 10) by a pair of cast in situ bodies of material 110 and 112. The tailstock support bar 68 spans the tank 84 (see FIGS. 4 and 10) and extends parallel to the axis of rotation of the spindle assembly. Thus, the tailstock support bar 68 extends from the mounting section 88 adjacent to a vertical outer side wall 116 of the tank to the mounting section 86 which is adjacent to a vertical inner side wall 118 of the tank and the wayblock mounting section 90.

Figure 12:
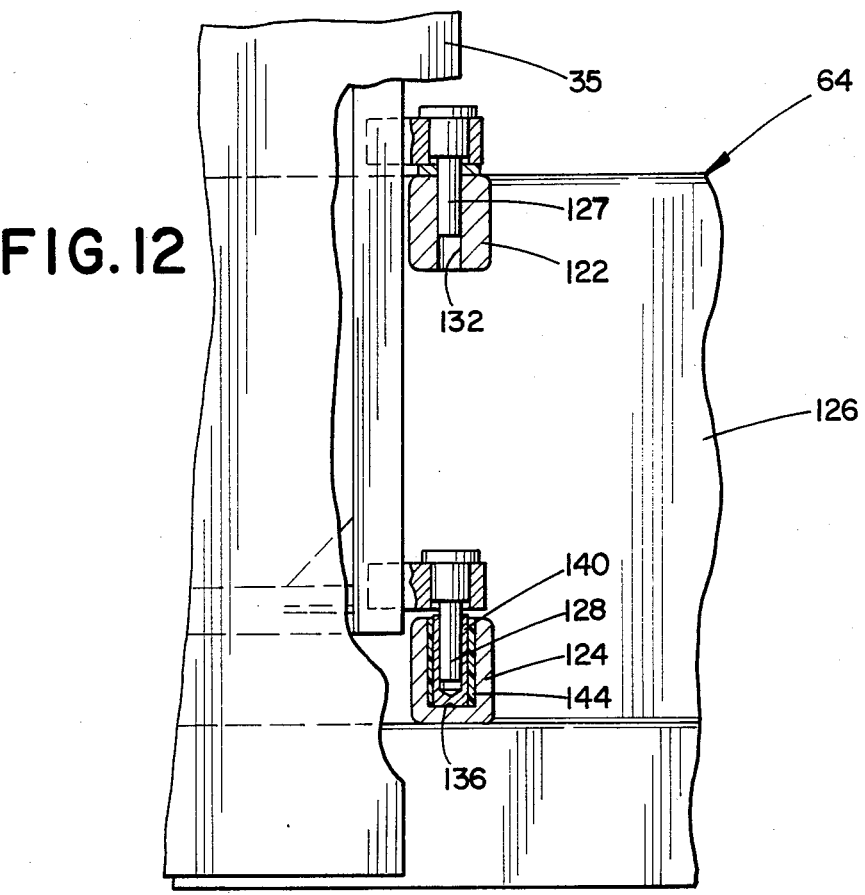
FIG. 12 is a side elevational view, further illustrating the manner in which the control cabinet is mounted on the base of the machine tool.

The base 64 includes a pair of hinge knuckles 122 and 124 (see FIGS. 2, 3, 11 and 12) which are cast as one piece with a vertical side wall 126 of the base 64. The hinge knuckles 122 and 124 receive hinge pins 127 and 128 (see FIGS. 4 and 12) which are fixedly connected with the control cabinet 35. A cylindrical hole 132 (see FIG. 12) is drilled through the upper hinge knuckle 122 to receive a hinge pin 127. The lower knuckle 124 has an as cast cylindrical cavity 136.

In order to eliminate machining of the knuckle 124, a cylindrical bushing 140 is held in the opening 136 in axial alignment with the opening 132 in the knuckle 122 by a cast in situ body of material 144. The body 144 of cast in situ material is disposed in a space between the cylindrical outer side surface of the bushing 140 and the as cast cylindrical inner side surface of the recess 136. By using the body of cast in situ material 144 to position the bushing 140, expensive machining operations to accurately align the opening 132 in the upper hinge knuckle 122 with the opening 136 in the lower hinge knuckle 124 are eliminated.

Figure 15:
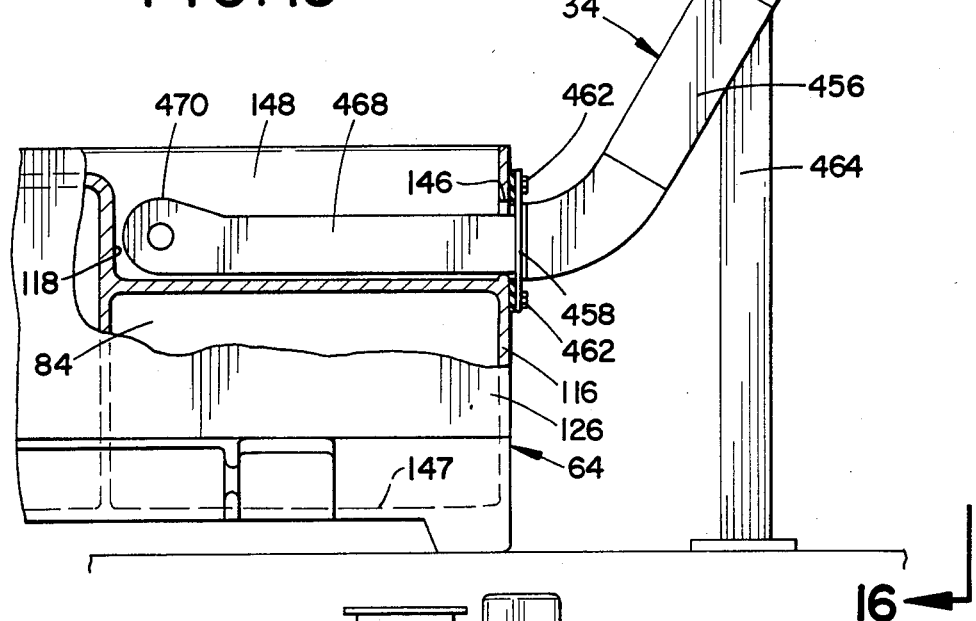
FIG. 15 is a fragmentary elevational view illustrating the manner in which a chip conveyor assembly is connected with the base of the machine tool.

The chip conveyor assembly 34 extends through a rectangular cast opening 146 (FIG. 4) in the side wall 116 of the tank section 82. The chip conveyor 34 is fastened to the side wall 116 and extends parallel to a horizontal bottom wall 147 of the tank to a location immediately beneath the spindle assembly 22 (FIG. 15). To simplify installation, the chip conveyor assembly 34 is connected with the base 64 only at the side wall 116. Although the chip conveyor assembly 34 has been illustrated as extending through the tank side wall 116, it is contemplated that the chip conveyor assembly could extend through the adjacent vertical side wall 148.

Wayblock Mounting

The as cast wayblock 66 must be accurately positioned relative to the spindle assembly 22. Thus, the longitudinal central axes of the tracks 74 and 76 (see FIG. 4) must extend perpendicular to a vertical plane containing the axis of rotation of a workpiece which is being rotated by the spindle assembly 22. The tolerance ranges for the as cast base 64, wayblock 66, and headstock 70 are far larger than the extremely small tolerance range in which the central axes of the tracks 74 and 76 can vary from the perpendicular relationship with the axis of rotation of the workpiece.

When the wayblock 66 is to be mounted on the base 64, it is necessary to first establish the desired spatial relationship between the wayblock and the base. The cast in situ body of material 94 is then poured between upwardly extending as cast surfaces formed on the base 64 and downwardly extending as cast surfaces formed on the wayblock 66. Upon solidification, the cast in situ body 94 of material cooperates with surfaces on the base 64 and wayblock 66 to hold the wayblock 66 against movement in any direction relative to the base 64. Thus, the body 94 of cast in situ material cooperates with the wayblock 66 and base 64 to hold the wayblock against movement under the influence of operating force components extending parallel and perpendicular to the longitudinal axis of the tracks 74 and 76.

The upwardly extending surfaces on the base 64 which cooperate with the body 9f material 94, are disposed in a generally rectangular basin 152 (see FIGS. 4, 6 and 7). The basin 152 is formed in the base 64 at the wayblock mounting section 90. The basin 152 is defined by a generally rectangular rim 154 which extends upwardly from a horizontal bottom surface 156 (see FIG. 4) of the basin 152.

The upwardly extending rim 154 of the basin 152 enables it to hold liquid epoxy material 94 before it hardens. When the material 94 has set, operating forces applied to the wayblock 66 are transmitted through the material to the base 64. Although it is contemplated that many different types of materials could be used, in one specific instance, the body of material 94 was a polymeric epoxy resin or grout which is sold under the trademark SIKADUR and is manufactured by Sika Chemical Corporation of Lyndhurst, N.J., U.S.A.

During operation of the machine tool 20, operating forces are transmitted from the wayblock 66 to the rim 154 of the basin 152. Thus, forces are applied against a pair of parallel, upwardly extending as cast side surfaces 160 and 162 (see FIG. 5) of the basin 152 as a result of operating force components applied to the turret 26 in a direction parallel to the central axis of the turret bar 30. Similarly, operating forces are applied against a pair of parallel upwardly extending as cast end surfaces 166 and 168 (FIG. 5) of the basin 152 by force components applied to the turret 26 in a direction extending perpendicular to the central axis of the turret bar 30.

The wayblock mounting basin 152 is indented to provide space for the tailstock support bar mounting section 86. This results in the basin rim 154 having an as cast vertical side surface 170 which extends parallel to and is offset from the side surfaces 160 and 162. In addition, the basin rim 154 has a vertical as cast side surface 172 which extends parallel to the side surfaces 166 and 168.

Upwardly extending projections in the basin 152 have vertical as cast side surfaces which extend parallel to the longitudinally extending central axes of the guide tracks 74 and 76 and the side surfaces 160 and 162 of the basin rim 154. The upwardly extending projections in the basin 152 also have vertical as cast side surfaces which extend perpendicular to the longitudinal central axes of the guide tracks 74 and 76 and to the side surfaces 160 and 162 of the basin rim 154. In addition, the upwardly extending projections in the basin 152 have vertical as cast side surfaces which are skewed at acute angles relative to the longitudinal central axes of the guide tracks 74 and 76 and the sides 160, 162, 166 and 168 of the basin rim 154.

The as cast side surfaces on the projections in the basin 152 are oriented to resist force components transmitted in any direction from the wayblock 66 through the cast in situ body 94 of material to the base 64 during operation of the machine tool 20. Thus, the as cast basin projection side surfaces which are perpendicular to the guide tracks 74 and 76 resist operating force components which extend parallel to the guide tracks. The as cast basin projection side surfaces which are parallel to the guide tracks 74 and 76 resist operating force components which extend perpendicular to the guide tracks. The as cast basin projection side surfaces which are skewed relative to the guide tracks 74 and 76 resist operating force components which are skewed relative to the guide tracks.

Although it is contemplated that the projections formed in the basin 152 could have many different configurations if desired, a relatively large open center projection 176 (FIGS. 4 and 5) is disposed beneath the guide tracks 74 and 76 and the headstock mounting section 98 on the wayblock 66. The projection 176 has an as cast vertical side surface 180 (FIG. 5) which extends parallel to the basin rim surfaces 166 and 168 and perpendicular to the longitudinal central axes of the tracks 74 and 76. The projection 176 has a pair of as cast vertical side surfaces 182 and 184 which are skewed at acute angles to the side surfaces 160, 162, 166 and 168 of the basin rim 154 and to the longitudinal central axes of the tracks 74 and 76. The configuration of the projection 176 enables the side surfaces 180, 182 and 184 to resist force components which are parallel and perpendicular to the longitudinal central axes of the tracks 74 and 76.

Figure 5:
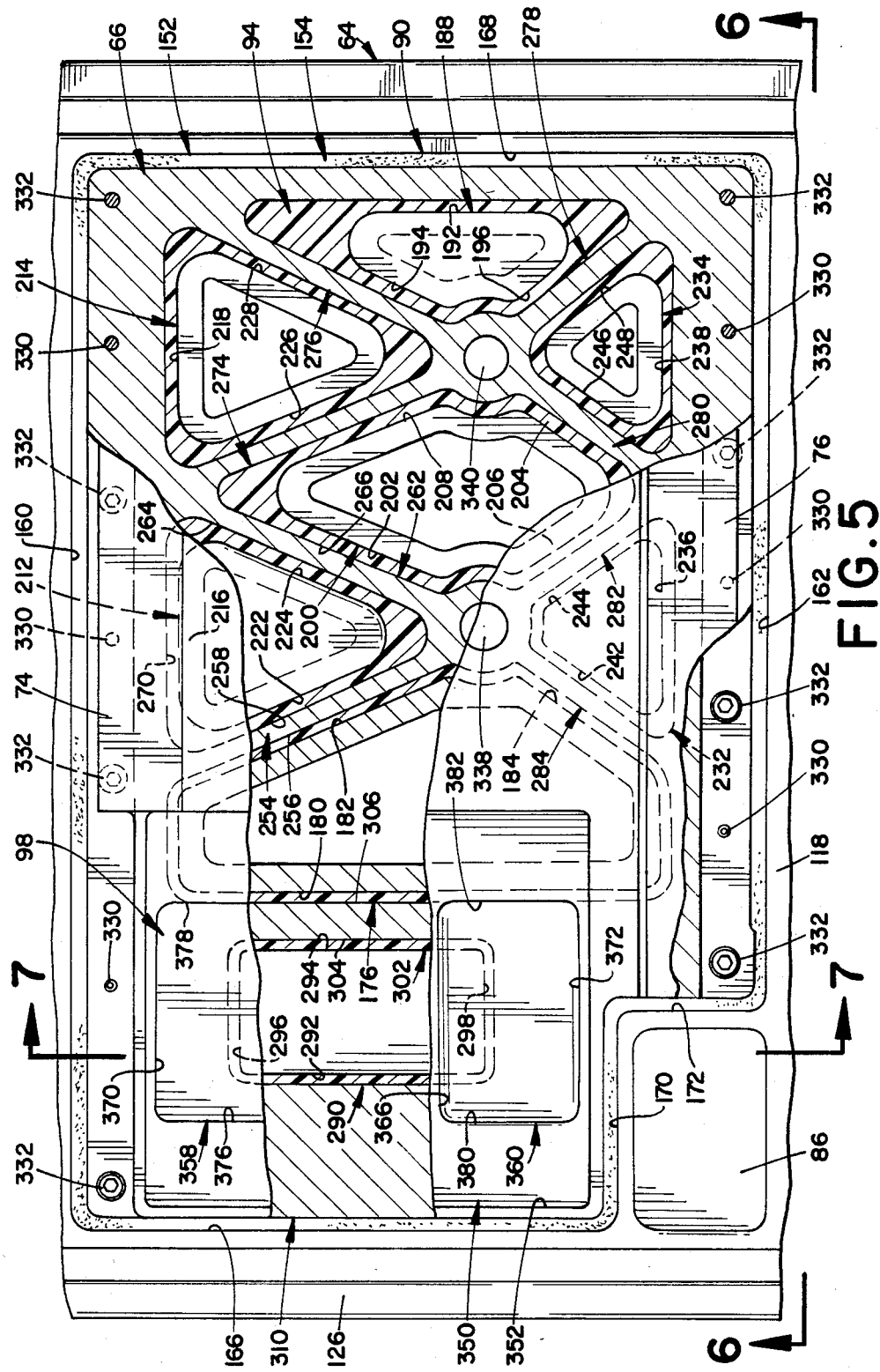
FIG. 5 is a fragmentary, partially broken away, sectional view illustrating the relationship between a cast in situ body of material and the base and wayblock of the machine tool of FIGS. 1–4.
Figure 11:
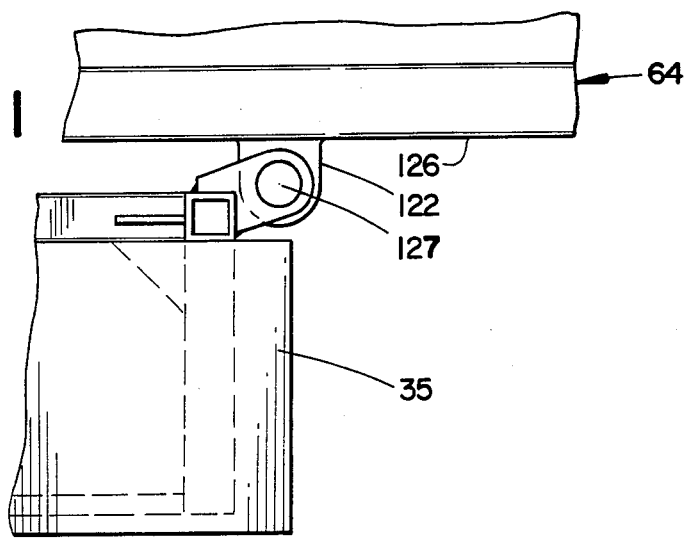
FIG. 11 is a fragmentary top elevational view illustrating the manner in which a control cabinet is mounted on the base of the machine tool.

At an end portion of the basin 152 opposite from the projection 176, that is the right end portion of the basin as viewed in FIGS. 4 and 5, a somewhat smaller, closed center projection 188 is formed. The projection 188 has an as cast vertical side surface 192 (FIG. 5) which extends parallel to the basin rim surface 168 and perpendicular to the longitudinal central axes of the tracks 74 and 76. A pair of as cast vertical side surface 194 and 196 on the projection 188 are skewed at acute angles relative to the side surfaces 160 and 168 of the rim and the longitudinal axes of the tracks 174 and 176.

An open center projection 200 (FIGS. 4 and 5) is formed in the central portion of the basin 152 between the two projections 176 and 188. The projection 200 has as cast vertical side surfaces which are skewed at acute angles relative to the sides of the basin rim 154 and the longitudinal central axes of the tracks 74 and 76. Thus, the central projection 200 has a pair of nonparallel as cast opposite side surfaces 202 and 204 (FIG. 5) and a second pair of nonparallel as cast opposite side surfaces 206 and 208 all of which are vertical and skewed at acute angles relative to the longitudinal central axes of the tracks 74 and 76.

In addition to the central projections 176, 188 and 200, a pair of projections 212 and 214 (FIGS. 4 and 5) are formed adjacent to the side 160 of the basin rim 154. The projections 212 and 214 have as cast vertical side surfaces 216 and 218 (FIG. 5) which extend parallel to the rim side surface 160 and the longitudinal central axes of the tracks 76 and 78. In addition, projections 212 and 214 have as cast vertical side surfaces 222, 224, 226 and 228 which are skewed at acute angles relative to the rim side surfaces 160, 162, 166 and 168 and the longitudinal central axes of the tracks 76 and 78.

A pair of projections 232 and 234 (FIGS. 4 and 5) are formed in the basin 152 adjacent to the rim side surface 162 opposite from the projections 212 and 214. The projections 232 and 234 have as cast vertical side surfaces 236 and 238 (FIG. 5) which extend parallel to the basin rim side surface 162 and the longitudinal central axes of the tracks 76 and 78. In addition, the projections 232 and 234 have as cast vertical side surfaces 242, 244, 246 and 248 which are skewed at acute angles to the rim side surfaces 160, 162, 166 and 168 and the longitudinal central axes of the tracks 76 and 78.

The sides of the projections 176, 188, 200, 212, 214, 232 and 234, and the sides 160, 162 and 168 of the basin rim 154 cooperate to form channels which receive downwardly extending projections or ribs on the wayblock 66 when the wayblock is positioned relative to the base 64. The lower ends of the ribs on the wayblock 66 are disposed above the bottom surface 156 of the basin 152 (FIGS. 6 and 7) to enable the epoxy material 94 to flow around the ribs.

The ribs on the wayblock 66 have as cast vertical side surfaces which are disposed approximately midway between the as cast vertical side surfaces of the upwardly extending base projections and basin rim 154. Thus, a downwardly extending projection or rib 254 (FIG. 5) on the wayblock 66 has an as cast vertical side surface 256 which extends generally parallel to and is spaced from the side surface 182 of the base projection 176. In addition, the rib 254 has an as cast vertical side surface 258 which extends generally parallel to and is spaced from the side surface 222 of the projection 212.

Similarly, a downwardly extending projection or rib 262 on the wayblock 66 has as cast vertical side surfaces 264 and 266 (FIG. 5) which extend parallel to and is spaced from the side surfaces 224 and 202 on the base projections 212 and 200. An as cast vertical side surface 270 on the wayblock 66 extends generally parallel to the side surface 216 on the projection 212 (FIG. 5) so that the projection 212 is surrounded by downwardly extending surfaces on the wayblock 66. The cast in situ body of material 94 cooperates with the wayblock side surface 270, wayblock ribs 254 and 262 and the base projections 176, 212 and 200 to transmit operating force components which extend parallel and perpendicular to the longitudinal central axes of the tracks 74 and 76 to the base projections during operation of the machine tool.

In addition to the ribs 254 and 262, the wayblock 66 is provided with downwardly extending ribs 274, 276, 278, 280, 282 and 284 having as cast vertical side surfaces. The ribs 274, 276, 278, 280, 282 and 284 cooperate with as cast vertical side surfaces on upwardly extending base projections 200, 212, 214, 188, 234, 232 and 176 to transmit force components from the wayblock 66 to the base 64.

The downwardly extending wayblock ribs 254, 262, 274, 276, 278, 280, 282 and 284 (FIG. 5) extend across the central portion of the wayblock 66 beneath the guide tracks 74 and 76 at acute angles to the longitudinal axes of the guide tracks 74 and 76. Since the wayblock ribs are disposed directly beneath the tracks 74 and 76, there is a direct transmission of operating forces from the wayblock tracks 74 and 76 to the base 64. Since the wayblock ribs are skewed at acute angles to the tracks 74 and 76, operating forces applied to the tracks in any direction can be transmitted to the base 64 by compression of portions of the body 94 of cast in situ material.

The basin 152 has a generally rectangular upwardly extending projection 290 (see FIGS. 4, 5, and 6) having as cast vertical side surfaces which extend parallel to the basin sides 160, 162, 166 and 168 (see FIG. 5). The wayblock 66 has downwardly projecting sections with as cast vertical side surfaces which are spaced from and extend generally parallel to the as cast vertical side surfaces of the projection 290. This results in the upwardly extending projection 290 being surrounded by downwardly extending side surfaces on the wayblock 66 with portions of the cast in situ body of material 94 between the upwardly extending surfaces on the projection 290 and the downwardly extending surfaces on the wayblock.

The projection 290 has as cast vertical side surfaces 292 and 294 which extend perpendicular to the longitudinal axes on the tracks 74 and 76. The projection 290 also has vertical as cast side surfaces 296 and 298 which extend parallel to the longitudinal central axes of the tracks 74 and 76. A downwardly extending projection or rib 302 (see FIGS. 5 and 6) on the wayblock 66 has as cast vertical side surface areas which extend parallel to and are spaced from as cast vertical side surface area 294 and 180 on the base projections 290 and 176 (FIG. 6). Similarly, the relatively large downwardly projecting section 310 on the wayblock 66 (see FIG. 6) has as cast vertical side surface areas 312 and 314 which extend parallel to and are spaced from as cast side surface areas 166 and 292 on the base 64.

The portion of the cast in situ body of material 94 between the downwardly extending ribs 302 and 310 on the wayblock 66 and the upwardly extending side surfaces of the basin projections 176 and 290 and rim side surface 166 are effective to transmit operating force components extending parallel to the longitudinal central axes of the wayblock tracks 74 and 76 to the base 64. In addition, downwardly extending projections or ribs 320 and 322 (see FIG. 7) on the wayblock 66 have vertical as cast side surface areas which cooperate with portions of the cast in situ body of material 94 and vertical as cast side surface areas 160, 296, 298 and 170 on the base 64 to transmit force components extending perpendicular to the longitudinal central axes of the tracks 74 and 76 to the base during operation of the machine tool 20.

When the wayblock 66 is to be mounted on the base 64, jack screws 330 and connector screws 332 (FIGS. 5, 6 and 7) disposed in longitudinal arrays (FIG. 5) along the guide tracks 74 and 76 are adjusted to accurately position the wayblock 66 relative to the base 64. The jack screws 330 are tightened to raise the wayblock 66 relative to the base 64 while the connector screws 332 are tightened to pull the wayblock downwardly toward the base 64. It should be noted that the wayblock 66 is supported by the jack and connector screws 330 and 332 with the wayblock spaced from the base 64. Since the wayblock 66 does touch the base 64, surfaces on the wayblock and base do not have to be accurately machined to provide for accurate placement of the wayblock relative to the base.

When the wayblock 66 has been accurately positioned relative to the base 64, the basin 152 is filled with a liquid epoxy material. This liquid epoxy material is poured into the basin 152 through three as cast vertical openings 336, 338 and 340 (see FIGS. 4 and 6) which extend downwardly through the wayblock 66. The liquid epoxy material which flows downwardly through the opening 336 (FIGS. 6 and 7) flows over the projection 290 and outwardly to the rim 154 of the basin 152. The liquid epoxy material which flows downwardly through the openings 338 and 340 (FIGS. 5 and 6) flows into the channels between the downwardly projecting ribs 254, 262, 274, 276, 278, 280, 282 and 284 on the wayblock 66 and the upwardly extending projections 176, 212, 214, 188, 234, 236 and 200 on the base 66. Since the bottom of the wayblock 66 is disposed above the bottom of the basin 152, epoxy material can flow into the spaces between the lower edges of the wayblock ribs and the bottom surface 156 of the basin.

Liquid epoxy material is poured into the openings 336, 338 and 340 until the basin 152 is filled to the level of the top of the rim 154 (see FIGS. 6 and 7). As the basin 152 is filled with liquid epoxy material, air escapes from the basin at the rim 154 and through a vent passage 344 (FIG. 7) formed in the wayblock 66. If desired, other vent passages could be provided in the wayblock 66.

When the basin 152 has been filled with the liquid epoxy material, the body of liquid extends across or seals the open lower end portion of the vent passage 344. Thus, the height of the projection 290 is slightly less than the height of the rim 154 and the other projections 176, 188, 200, 212, 214, 232 and 234 in the basin 152 (see FIG. 6). Therefore, the liquid epoxy material will fill the basin to a level above the top of the projection 290 before the level of the liquid epoxy reaches the upper edges of the basin rim 154 and the top of the other base projections.

When the basin 152 has been filled with liquid epoxy to the uppermost edge portion of the rim 154, the downwardly extending projections on the wayblock 66 are emerged in the body of the liquid epoxy. Since the wayblock 66 is supported above the base 64 by the jack and connector screws 330 and 322, the body of liquid epoxy extends between the bottom 156 of the basin 152 and the lower ends of the downwardly extending projections 254, 262, 274, 276, 278, 280, 282, 284, 302, 310, 320 and 322 on the wayblock (see FIGS. 5, 6 and 7). The body of liquid epoxy also extends upwardly along the as cast vertical side surfaces of the downwardly extending wayblock projections and the upwardly extending base projections.

When the liquid epoxy resin solidifies, it hardens and firmly holds the wayblock 66 in position relative to the base 64. Relatively large operating forces can be transmitted through the hardened epoxy material 94 from the wayblock 66 to the base 64. Due to the orientation of the as cast vertical side surfaces on the upwardly extending base projections in the basin 152 and the downwardly extending projections on the wayblock 66, compression forces are applied to portions of the body 94 of cast in situ material by operating force components extending either parallel or perpendicular to the guide tracks 74 and 76. Since the body 94 of cast in situ material is relatively strong in compression, large operating force components can be transmitted from the wayblock 66 to the base 64. The transmittal of large operating forces is possible since there is a substantially larger force transmittal area than would be provided by the rim 154 on the basin 152 if the wayblock had a solid or continuous lower surface.

Headstock Mounting

The headstock 70 is mounted on the wayblock 66 adjacent to the ends of the tracks 74 and 76. The as cast headstock mounting section 98 (FIG. 4) of the wayblock 66 includes a basin 350 (FIGS. 7, 8 and 9) having a generally rectangular rim 352. An as cast projection 356 (FIG. 8) extends upwardly into a central portion of the basin 350. The projection 356 is disposed between a pair of as cast rectangular recesses 358 and 360.

Downwardly extending as cast rectangular projections 362 and 364 (FIG. 8) on the headstock 70 are disposed in the recesses 358 and 360. As cast vertical side surfaces 364 and 366 on the wayblock projection 356 extend perpendicular to the central axis of the spindle assembly 22 and parallel to the longitudinal central axes of the guide tracks 74 and 76. In addition, as cast vertical side surfaces 370 and 372 of the recesses 358 and 360 extend perpendicular to the longitudinal axis of the spindle assembly 22. The recess 358 has as cast vertical side surfaces 376 and 378 (FIG. 5) which extend parallel to the central axis of the spindle assembly 22. In addition, the recess 360 has as cast vertical side surfaces 380 and 382 (FIGS. 5 and 9) which extend parallel to the central axis of the spindle assembly 22.

When the headstock 70 is to be mounted on the wayblock 66, jack screws 386 (FIG. 9) and connector screws 388 are used to accurately position the headstock 70 relative to the wayblock 66. Although only a single jack screw 386 and connecting screws 388 have been shown in FIG. 9, it should be understood that there are a plurality of jack and connector screws 386 and 388 to support the headstock 70 above and spaced from the wayblock 66. Thus, the headstock 70 does not touch the wayblock 66.

By adjusting the jack and connector screws 386 and 388, the headstock 70 can be accurately positioned with the central axis of an opening 390 (FIG. 8) horizontal in a plane which extends perpendicular to the longitudinal central axes of the tracks 74 and 76 on the wayblock 66. In addition, the level of the central axis of the opening 390 can be adjusted to precisely position it relative to the level of the central axis of the turret bar 30. The spindle assembly 22 can then be accurately mounted in the opening 390 with the central axis of the spindle assembly horizontal and perpendicular to the central axis of the wayblock tracks 74 and 76.

Once the headstock 70 has been positioned relative to the wayblock 66 by the use of the jack and connector screws 386 and 388, the basin 350 is filled with the aforementioned liquid epoxy material to form the cast in situ body 102 of material. The liquid epoxy material is poured into the basin 350 along the rim 352 of the basin. The liquid epoxy material flows into the space between the downwardly extending projections 362 and 364 on the headstock 70 (FIG. 8) and the upwardly extending projections 356 on the basin 350. In addition, the epoxy material fills the opening 336 which extends downwardly through the wayblock 66 to the base 64 (see FIGS. 7 and 8). It should be noted that the passage 344 is sealed by the epoxy material which was previously set up on the basin 152. Therefore, the epoxy material cannot flow from the basin 350 through the vent passage 344 to the outside of the wayblock 66.

Operating force components which are applied to the spindle assembly 22 in a direction parallel to the central axis of the spindle assembly are transmitted from the downwardly extending headstock projections 362 and 364 to the upwardly extending side surfaces 364, 366, 370 and 372 on the wayblock 66 by the body 102 of cast in situ material. Operating force components which are applied to the spindle assembly 22 in a direction perpendicular to the central axis of the spindle assembly are transmitted from the downwardly extending headstock projections 362 and 364 to the upwardly extending side surfaces 376, 378, 380 and 382 on the wayblock 66 by the body 102 of cast in situ material. Since the cast in situ body 102 of material is loaded in compression by the operating forces applied to the headstock 70, relatively large operating force components can be transmitted from the headstock 70 to the wayblock 66.

Tailstock Mounting

The tailstock support bar 68 is provided with a pair of downwardly extending as cast projections 396 and 398 (FIG. 10) which have a generally rectangular configuration. The support bar projections 396 and 398 are received in as cast rectangular recesses 400 and 402 at the tailstock mounting sections 86 and 88 on the base 64.

Jack screws 404 and connector screws 406 are used to position the tailstock mounting bar 68 with the central axis of a quill or center 412 (FIG. 10) on the tailstock 24 horizontal and in a coaxial relationship with the central axis of the spindle assembly 22. By adjusting the jack screws 404 and the connector screws 406, the central axis of the quill 412 can be exactly aligned with the central axis of the spindle assembly. The jack and connector screws hold the support bar 68 a spaced apart relationship with the base 64.

When the tailstock support bar 68 has been properly positioned, the recesses 400 and 402 are filled with the aforementioned liquid epoxy material. The liquid epoxy material extends around the projections 396 and 398 between the vertical as cast side surfaces of the projections and the vertical as cast side surfaces of the recesses 400 and 402. The recess 400 is filled with liquid epoxy material by pouring the material through an opening 410 extending through the projection 396. The recess 402 in the tailstock mounting section 88 is filled with epoxy material by pouring it into the space between the sides of the downwardly extending projection 398 and the upwardly extending side of the recess. When the epoxy material hardens, it is effective to transmit operating forces applied to the tailstock support bar to the base 64 and to maintain the central axis of the headstock 24 aligned with the central axis of the spindle assembly 22.

The tailstock support bar 68 extends across the vertical tank 84 from the mounting section 88 to the mounting section 86 at a location adjacent to the vertical side wall 126 of the base 64. The tailstock support bar 68 has a horizontal central axis which extends parallel to the bottom wall 147 and side walls 126 and 148 of the rectangular tank 84. This results in the tailstock support bar 68 being disposed adjacent to relatively rigid corner portions of the rectangular tank 84.

Spindle Drive Motor Mounting Means

The spindle drive motor 82 (FIGS. 13 and 14) is mounted on a platform section 422 of the one-piece cast base 64. The platform section 422 is connected with and partially supported by the longitudinally extending side wall 126 of the base 64.

A plurality of openings 424 (see FIG. 14) are tapped and drilled in the platform 422. Each of the opening 424 includes a relatively small diameter tapped section 426 and a relatively large diameter tapped section 428. The small diameter tapped section 426 is engaged by an externally tapped rod 432. An externally threaded sleeve 434 engages the relatively large diameter tapped section 428 through the hole 424. The sleeve has a central opening which is the same size as the external diameter of the rod 432 and extends around the rod 432.

By turning the sleeve 434, the position of the motor support bracket 436 can be adjusted vertically relative to the platform 432. A retaining nut 438 is connected to the upper end portion of the rod 432 and holds the motor support bracket 436 firmly against the upper end portion of the sleeve 434. The motor support bracket 436 is fixedly connected to the motor 82. It should be understood that similar mounting arrangements are provided at each of the four corners of the motor 82. Therefore, the position of the motor 82 can be adjusted relative to the platform 422 so that the output or drive shaft 442 of the motor 82 extends parallel to the central axis of the spindle assembly 22 (see FIG. 2).

A belt 446 transmits drive forces from a sheave or pulley 448 keyed to a motor output shaft 442 to a sheave or pulley 450 connected with the spindle assembly 22. The motor pulley 448 is movable axially along the motor drive shaft 442 to align the drive belt 446 vertically with the spindle pulley 450.

Chip Conveyor Assembly

Figure 16:
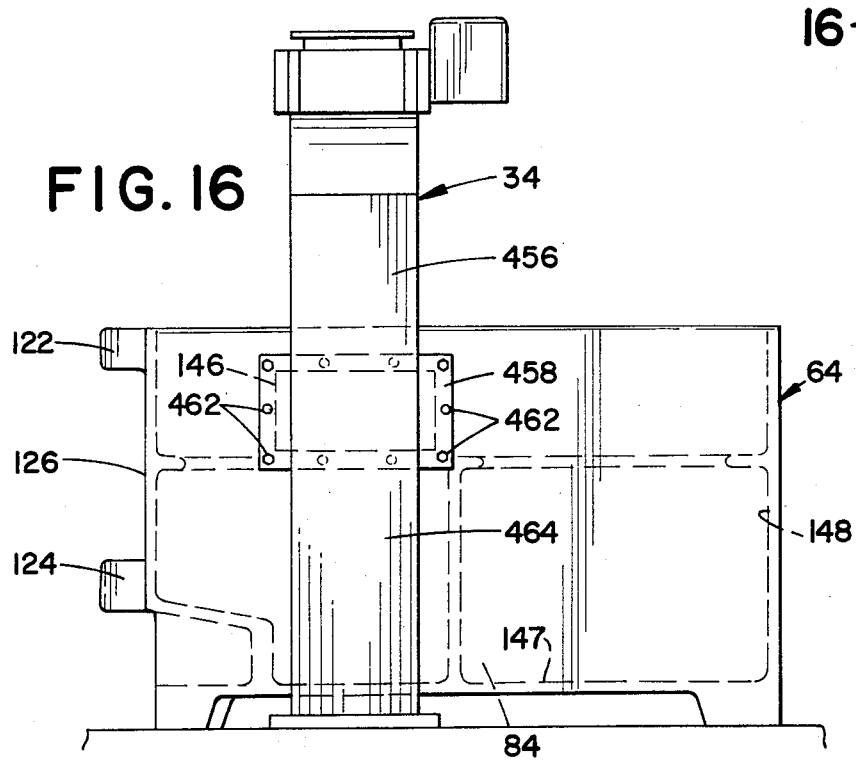
FIG. 16 is an end view, taken generally along the line 16—16 of FIG. 15, further illustrating the manner in which the chip conveyor assembly is connected with the base of the machine tool.

The chip conveyor assembly 34 (see FIGS. 15 and 16) is connected to the as cast side wall 116 of the base 64. The chip conveyor assembly 34 includes an outer housing 456 which encloses a chain type conveyor. A collar 458 is connected with the housing 456 and is connected to the side wall 116 of the base 64 by a plurality of fasteners 462.

A vertical support member or stand 464 supports the outer end portion of the chip conveyor assembly 34. The inner end portion 468 extends across the coolant tank 84 to a free end 470. The only connection between the conveyor assembly 34 and the base 64 is at the collar 458. This enables the conveyor assembly 34 to be quickly and easily attached to the base.

The inner end portion 468 of the chip conveyor assembly 34 extends across the tank to the opposite side wall 118. The inner end portion of the chip conveyor assembly 34 has an open section 472 (see FIG. 4) through which chips cut from the workpiece engage the chain conveyor and are removed from the base 64. Thus, the inner end portion 468 of the chip conveyor 34 is disposed directly beneath the central axis of the spindle assembly 22. Suitable shields (not shown) are provided to direct chips cut from a workpiece downwardly to the opening 472 (see FIG. 4) in the chip conveyor assembly housing 456.

SUMMARY

In view of the foregoing description, it is apparent that the machine tool 20 has structural components which are assembled with a minimum of machining. Thus, the machine tool has a one piece, as cast base 64 which does not have any or at most a minimum of machined surfaces. A one piece, as cast wayblock 66 is connected with the base 64. Although the majority of the wayblock 66 is in an as cast condition, tracks 74 and 76 for guiding movement of a turret carriage are machined on the wayblock.

The wayblock 66 is held against movement both along and transversely to the tracks 74 and 76 by a cast in situ body 94 of material. The cast in situ body 94 of material is received between as cast surfaces formed on upwardly extending projections 176, 188, 200, 212, 214, 232 and 234 on the base 64 and as cast surfaces on downwardly extending projections 254, 262, 274, 276, 278, 280, 282 and 284 on the wayblock 66. Some of the surfaces on the wayblock and base projections extend transversely to other surfaces on the projections so that the cast in situ body 94 of material is compressed by machine tool operating forces which are applied to the wayblock 66 in any direction. Since the cast in situ body 94 of material has a high compression strength, relatively large operating forces can be transmitted from the wayblock 66 to the base 64.

A headstock 70 and spindle assembly 22 are mounted on one end portion 98 of the wayblock 66. The headstock 70 is held against movement relative to the wayblock 66 by a body 102 of cast in situ material disposed between downwardly extending as cast surfaces on the headstock and upwardly extending as cast surfaces on the wayblock.

A tailstock assembly 24 is supported on the base by a tailstock support bar 68. Opposite ends of the tailstock support bar 68 are held against movement relative to the base 64 by cast in situ bodies 110 and 112 of material disposed between downwardly extending as cast surfaces on the tailstock support bar and upwardly extending as cast surfaces on the base.

A chip conveyor assembly 34 is advantageously mounted on the base 64 as a unit. Thus, the chip conveyor assembly 34 extends through an as cast hole 146 formed in a sidewall 116 of the base 64. The chip conveyor assembly is connected with the base 64 only by fasteners 462 between a collar 458 and the base.

Having described one specific preferred embodiment of the invention, the following is claimed:

1. A machine tool comprising a one-piece cast base having side walls which define a tank to hold coolant during operation of said machine tool, said base including a wayblock mounting section disposed adjacent to one end of said tank, said wayblock mounting section including surface means for defining an upwardly opening first basin having a bottom and a rim extending upwardly from and around the periphery of the bottom of said first basin, said wayblock mounting section further including a plurality of projections extending upwardly from the bottom of said first basin, said projections having a plurality of upwardly extending as cast surface areas disposed within said first basin at locations spaced from the rim of said first basin with some of said surface areas extending transversely to other of said surface areas, a cast wayblock having an upper side portion with a track for engaging a tool support carriage, said wayblock including a plurality of projections extending downwardly into said first basin, said wayblock projections having lower end portions which are spaced from the bottom of said first basin and a plurality of downwardly extending as cast surface areas which are disposed in said first basin with some of said wayblock surface areas extending transversely to other of said wayblock surface areas, said as cast surface areas on said wayblock projections facing toward and spaced from said as cast surface areas on said base projections, first force transmitting means for transmitting operating forces having components extending along and transversely to said track from as cast surfaces on said wayblock to as cast surface areas on said base during operation of said machine tool, said first force transmitting means including a body of cast in situ material which substantially fills said first basin and extends into spaces between said as cast surface areas on said base and wayblock projections, a tool support carriage movable along said track and having means for holding tools to cut material from a portion of the workpiece disposed over said tank, said wayblock including surface means for defining a second upwardly opening basin adjacent to said track, said second basin having a bottom and a rim extending around the periphery of the bottom of said second basin, said wayblock having a plurality of upwardly extending as cast surface areas disposed within said second basin at locations spaced from the rim of said second basin with some of said as cast surface areas within said second basin extending transversely to other of said as cast surface areas within said second basin, said machine tool further comprising a cast spindle housing for supporting a spindle assembly, said spindle housing having projections extending downwardly into said second basin, said spindle housing projections having lower end portions which are spaced from the bottom of said second basin and a plurality of downwardly extending as cast surface areas which are disposed in said second basin with some of said as cast surface areas on said spindle housing projections extending transversely to other of said as cast surface areas on said spindle housing projections, said as cast surface areas on said spindle housing projections facing toward and spaced from said as cast surface areas disposed in said second basin on said wayblock, second force transmitting means for transmitting operating forces from as cast surface areas on said spindle housing to as cast surface areas on said wayblock during operation of said machine tool, said second force transmitting means including a second body of cast in situ material which substantially fills said second basin and extends into spaces between the as cast surface areas on the projections extending downwardly from said spindle housing and the as cast surface areas disposed in said second basin on said wayblock, said machine tool further comprising a spindle assembly at least partially enclosed by said spindle housing for rotating a workpiece, and chip conveyor means for conducting material cut from the workpiece from said tank, said chip conveyor means extending through an opening in a side of said tank to a location adjacent to said wayblock mounting section of said base.

2. A machine tool as set forth in claim 1 wherein said wayblock has a lower end portion which is disposed within the basin and is spaced from the rim of the basin, said cast in situ body of material extending between the rim of the basin and the lower end portion of said wayblock throughout the extend of the rim.

3. A machine tool as set forth in claim 1 further including passage means extending through said wayblock between the first basin defined by said surface means on said base and the second basin for conducting material to be cast through said wayblock to the first basin defined by said surface means on said base.

4. A machine tool comprising a one piece cast base, said base including first and second spaced apart sidewalls, third and fourth spaced apart sidewalls extending between said first and second spaced apart sidewalls, a bottom wall connected with and extending between lower end portions of said sidewalls, said bottom wall and said sidewalls cooperating to define a tank at least a portion of which holds coolant during operation of said machine tool, said one piece cast base further including a wayblock mounting section disposed adjacent to an upper end portion of said first sidewall and having a plurality of upwardly extending surface areas in an as cast condition, a first tailstock mounting section disposed adjacent to an intersection of the upper end portions of said first and third sidewalls and having a plurality of upwardly extending surface areas in an as cast condition, and a second tailstock mounting section disposed adjacent to an intersection of the upper end portions of said second and third sidewalls and having a plurality of upwardly extending surface areas in an as cast condition, said machine tool further including spindle means connected with said one piece cast base for rotating a workpiece about an axis extending transversely to said first and second sidewalls with a portion of the workpiece extending over said tank, a one piece cast wayblock having an upper side with surface means for defining a track having a longitudinally extending central axis and a lower side with a plurality of downwardly extending surface areas in an as cast condition, first connector means for connecting said wayblock to said wayblock mounting section of said base with the longitudinal central axis of said track extending perpendicular to the axis of rotation of the workpiece and for transmitting operating forces from said wayblock to said base during operation of said machine tool, said first connector means including a first body of material cast in situ between and at least partially shaped by said plurality of upwardly extending surface areas on said wayblock mounting section of said base and said plurality of downwardly extending surface areas on said wayblock, a carriage disposed on said track and movable along said track toward and away from the axis of rotation of the workpiece, a turret bar mounted on said carriage and movable relative to said carriage along an axis which extends parallel to the axis of rotation of the workpiece, said turret bar being movable between a retracted position in which an outer end portion of said bar is disposed adjacent to and above said first sidewall and an extended position in which the outer end portion of said turret bar is disposed above said tank, turret means connected with the outer end portion of said turret bar for holding tools to cut material from the portion of the workpiece disposed over said tank as the workpiece is rotated by said spindle means, a tailstock support bar extending across said tank adjacent to said third sidewall, said tailstock support bar including a first end portion having a plurality of downwardly extending surface areas in an as cast condition and a second end portion having a plurality of downwardly extending surface areas in an as cast condition, second connector means for connecting said first end portion of said tailstock support bar to said first tailstock mounting section of said base and for transmitting operating forces from said first end portion of said tailstock support bar to said base during operation of said machine tool, said second connector means including a second body of material cast in situ between and at least partially shaped by said plurality of upwardly extending surface areas on said first tailstock mounting section of said base and said plurality of downwardly extending surface areas on said first end portion of said tailstock support bar, and third connector means for connecting said second end portion of said tailstock support bar to said second tailstock mounting section of said base and for transmitting operating forces from said second end portion of said tailstock support bar to said base during operation of said machine tool, said third connector means including a third body of material cast in situ between and at least partially shaped by said plurality of downwardly extending surface areas on said second tailstock mounting section of said base and said plurality of upwardly extending surface areas on said second end portion of said tailstock bar.

5. A machine tool as set forth in claim 4 wherein said wayblock mounting section of said one piece cast base further includes surface means for defining a basin having a bottom and a rim extending around the periphery of the bottom of the basin, said wayblock mounting section further including a plurality of projections extending upwardly from the bottom of the basin, said upwardly extending surface areas of said wayblock mounting section being disposed in the basin on said projections, said wayblock including a plurality of projections which extend downwardly into the basin, said wayblock projections having lower end portions which are spaced from the bottom of the basin, said downwardly extending areas of said wayblock being disposed on said wayblock projections, said first body of cast in situ material substantially filling said basin and extending into spaces between the surface areas on said upwardly extending wayblock mounting section projections and said downwardly extending wayblock projections.

6. A machine tool as set forth in claim 4 further including chip conveyor means for conveying from said tank material cut from the workpiece, said chip conveyor means including a conveyor assembly which extends through an opening in one of said sidewalls and across said tank to a location adjacent to said first sidewall, said chip conveyor means being disposed above said bottom wall at a location beneath the axis of rotation of the workpiece, and fourth connector means for connecting said chip conveyor means to said one of said sidewalls.

7. A machine tool as set forth in claim 4 wherein said one piece cast base further includes a motor mounting section having a generally horizonal support section disposed on a side of said wayblock mounting section opposite from said tank, said third sidewall extending past said wayblock mounting section and along one side of said horizontal support section, said machine tool further including motor means for driving said spindle means and fourth connector means for connecting said motor means to said horizontal support section.

8. A machine tool as set forth in claim 4 wherein said upper side of said wayblock includes a headstock mounting section disposed adjacent to an end of said track, said headstock mounting section including a plurality of transversely extending surface areas in an as cast condition, said machine tool further including a cast headstock having a lower side with a plurality of transversely extending surface areas in an as cast condition, said headstock including an opening for receiving said spindle means and fourth connector means for connecting said headstock to said headstock mounting section of said wayblock and for transmitting operating forces from said headstock to said wayblock during operation of the machine, tool.

9. A machine tool as set forth in claim 4 further including cabinet means for holding machine tool controls and hinge means for pivotally connecting said cabinet means with said base, said hinge means including a plurality of hinge knuckles cast as on piece with said third sidewall, one of said hinge knuckles including a housing having a cavity with a side housing surface area in an as cast condition, said hinge means including a hollow bearing member disposed in said cavity, fourth connector means for connecting said bearing member with said housing, said fourth connector means including a fourth body of material cast in situ between and at least partially shaped by the side surface area of said cavity and an outer side surface of said bearing member, said hinge means including a hinge pin connected with said cabinet means and extending into said hollow bearing member.

10. A machine tool (20) comprising a cast base (64), a separately cast wayblock (66) disposed on said base and having a track (74,76), a tool support carriage (46) movable along said track and having means (26) for holding tools (54) to cut material from a workpiece, a separately cast headstock member (70), a spindle assembly (22) disposed mounted on said headstock member (70) including a spindle for rotating a workpiece while it is engaged by the tools (52), mounting means for mounting each of said separately cast wayblock (22), base (64), and headstock member (70) in alignment with respect to each other, said mounting means comprising:

(a) at least one projection (254) cast into said separately cast wayblock (66), a cast-in basin (152) on said base having a horizontal bottom surface (156) and an encircling rim (154), said at least one projection received into said basin with a clearance space between said basin bottom (156) and rim (154);

(b) first force transmitting means for transmitting forces from the cast surfaces of said at least one projection on said wayblock to the bottom surface (156) and rim (154) of the as cast basin on said base during operation of said machine tool, said first force transmitting means including a body (94) of cast in situ material which extends into said clearance space between the as cast basin and projection surfaces on the said base and wayblock;

(c) at least one projection cast into said separately cast headstock member (70); a basin cast into one of said base (64) or said wayblock (22), said basin having an encircling rim (352), and a bottom surface and receiving said at least one projection of said headstock member (70) with a clearance space between said rim and bottom and said at least one projection;

(d) and second force transmitting means for transmitting forces from as cast surfaces on said at least one projection on said headstock member to the bottom surface and rim (352) of the as cast basin surfaces on said wayblock or said base during operation of said machine tool, said second force transmitting means including a second body (102) of cast in situ materal which extends into said clearance space between the as cast surfaces on said at least one projection and basin.

11. A machine tool comprising a cast base, a cast wayblock disposed on said base and having a track, a tool support carriage movable along said track and having means for holding tools to cut material from a workpiece, a cast spindle housing disposed on said wayblock, a spindle at least partially enclosed by said spindle housing for rotating the workpiece while it is engaged by the tools, first force transmitting means for transmitting forces from the cast surfaces on said wayblock to as cast surfaces on said base during operation of said machine tool, said first force transmitting means including a body of cast in situ material which extends into spaces between the as cast surfaces on said base and wayblock, and second force transmitting means for transmitting forces for as cast surfaces on said spindle housing to as cast surfaces on said wayblock during operation of said machine tool, and second force transmitting means including a second body of cast in situ material which extends into spaces between the as cast surfaces on said spindle housing and wayblock; said base further including a tank to hold coolant during operation of the machine tool, a first tailstock mounting section disposed adjacent to a first side of said tank, and a second tailstock mounting section disposed adjacent to a second side of said tank opposite from said first side of said tank, said machine tool further including a cast tailstock support bar extending across said tank, and third force transmitting means for transmitting operating forces from as cast surfaces on said tailstock support bar to as cast surfaces on said base during operation of said machine tool, said third force transmitting means including a third body of cast in situ material which extends into spaces between as cast surfaces on said tailstock support bar and said first tailstock mounting section of said base and a fourth body of cast in situ material which extends into spaces between as cast surfaces on said tailstock support bar and said second tailstock mounting section of said base.

12. A machine tool as set forth in claim 11 further including chip conveyor means for conducting from said tank material cut from the workpiece, said chip conveyor means extending through an opening in a side of said tank and at least part way across said tank to a location adjacent to said wayblock.

* * * * *